United States Patent [19]

Hultstrand

[11] Patent Number: 5,476,261
[45] Date of Patent: Dec. 19, 1995

[54] ADAPTOR FOR A MACHINE HAVING A CONTROLLER AND BUTTONS FOR OPERATION THEREOF

[76] Inventor: Victor S. Hultstrand, 930 Joaquim Rd., Pensacola, Fla. 32506

[21] Appl. No.: 95,893

[22] Filed: Jul. 8, 1993

Related U.S. Application Data

[63] Continuation of Ser. No. 879,282, May 7, 1992, abandoned.

[51] Int. Cl.⁶ .................................................. A63B 71/04
[52] U.S. Cl. ....................................................... 273/148 B
[58] Field of Search ........................ 273/148 B, DIG. 25; 379/447, 456, 457; 400/472, 473

[56] References Cited

U.S. PATENT DOCUMENTS 3,841,628 10/1974 Goldfarb ..................... 273/DIG. 25 X
3,927,282 12/1975 Firstenberg .............................. 379/447
5,034,574 7/1991 Martovitz ........................ 273/148 B X Primary Examiner—Raleigh W. Chiu
Attorney, Agent, or Firm—John K. Donaghy

[57] ABSTRACT

An adaptor for a button or pad controlled machine having at least one control button and a control pad wherein the adaptor includes a top surface having an outer periphery extending beyond the dimensions of either the control button or control pad and having a base adapted to engage either the control button or control pad whereby when the outer periphery is pressed on any point, either the control button or the control pad is activated.

4 Claims, 5 Drawing Sheets

ADAPTOR FOR A MACHINE HAVING A CONTROLLER AND BUTTONS FOR OPERATION THEREOF

This is a continuation of application Ser. No. 07/879,282, filed May 7, 1992, now abandoned.

BACKGROUND OF THE INVENTION

1. Field of the Invention

This invention pertains to an adaptor for direction controllers for machines and particularly to an adaptor for a video machine control pad and buttons having standard cross-shaped directional control pad switches of various sizes and having two or more push button switches of various sizes for fire and special effects functions.

2. Background of the Prior Art

The prior art shows various types of attachments to machines having push button controls.

Representative of the prior art are the following patents:

U.S. Pat. No. 3,927,282 shows an attachment to the push-button telephone keys which provide a large surface area and makes it possible to locate the keys and depress them more easily.

U.S. Pat. No. 4,158,130 shows an auxiliary keyboard for a data terminal device.

U.S. Pat. No. 4,297,044 is an additional attachment for key operated devices having a frame for covering the keyboard and additional keys for operating the keyboard keys.

U.S. Pat. No. 4,367,386 shows a snap-on actuator for miniature toggle switches.

U.S. Pat. No. 4,825,019 discloses a cursor control accessory for a computer keyboard.

U.S. Pat. No. 4,945,357 is a joystick assembly for push button keys.

The present invention is not for use with toggle switches or machine keyboard push button keys. Rather, the present invention is an adaptor for use with machines having control pads and operation buttons which, ordinarily, provide no mechanical advantage due to their shape and the direct pressure required to operate them.

SUMMARY OF THE INVENTION

It is an object of this invention to provide an adaptor for use on various machines having controllers and operation buttons which will make it easier to operate the controller and buttons without experiencing fatigue.

It is another object of this invention to provide an adaptor for the cross-shaped control pad and the fire and special effects buttons of machines having such controls which provide comfortable and non-fatiguing ergometric control surfaces.

It is still another object of this invention to provide an adaptor for a video game machine controller pad which adaptor provides a lever arm due to the oversized top thumb surface mounted above a smaller base, the latter being attached to the controller pad's raised cross and special effect buttons.

And still another object of this invention is to provide an adaptor for video game machine controllers which adaptor provides a mechanical advantage thus enhancing operation of the controllers and reducing fatigue experienced by users using the conventional machine controllers without the adaptors.

Another object of this invention is to provide a video game machine control pad attachment having a large concave surface area for the thumb which makes for ease in operating the controller pad switches yet prevents overcontrolling as happens with joy sticks device.

An important advantage of this invention over the prior art is the provision of a lever arm which provides a mechanical advantage for the conventional cross-shaped control pad switch and the button switches of machines thus reducing fatigue.

These objects and advantages of the invention will become more apparent from a study of the following specifications and the annexed drawings.

DESCRIPTION OF THE PREFERRED EMBODIMENT OF THE INVENTION

Figure 1:
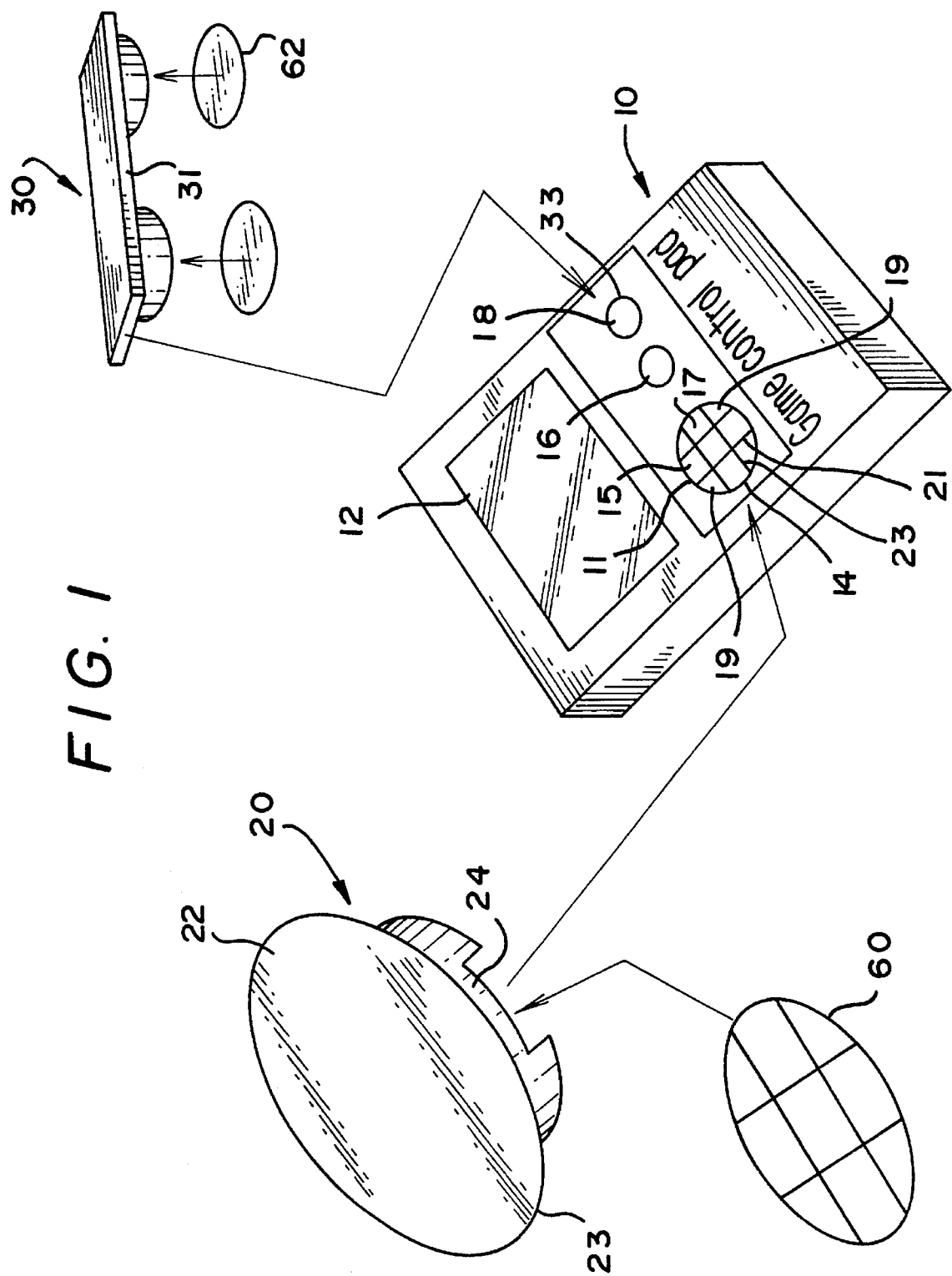
FIG. 1 is a perspective blow-up view of a portable video machine showing the switch controllers and the adaptors thereto.
Figure 4:
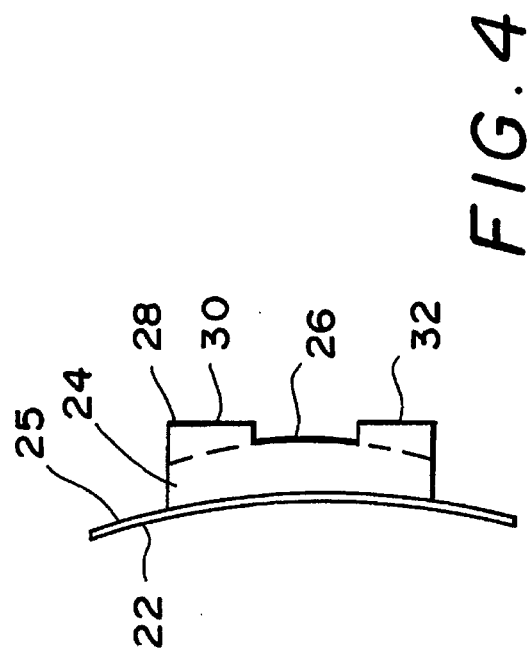
FIG. 4 is a side view of the adaptor of FIG. 2.
Figure 2:
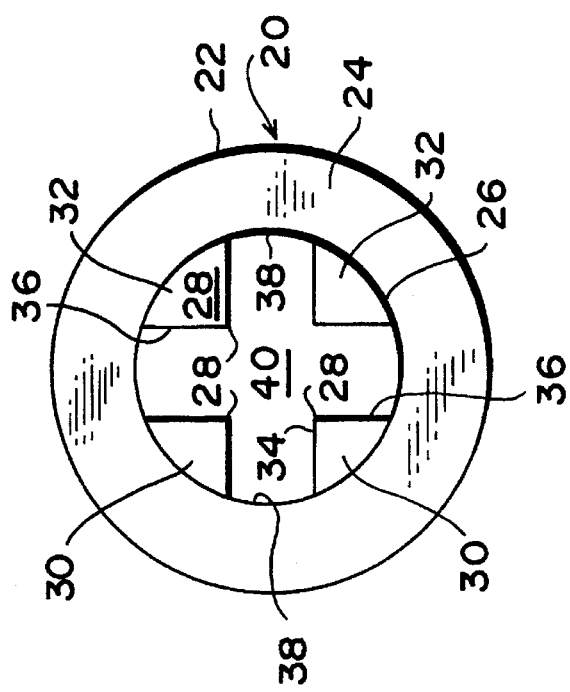
FIG. 2 is a bottom view of the adaptor for the cross-shaped control pad switch showing a cross-shaped opening for placement over the raised cross-shaped control pad switch.
Figure 3:
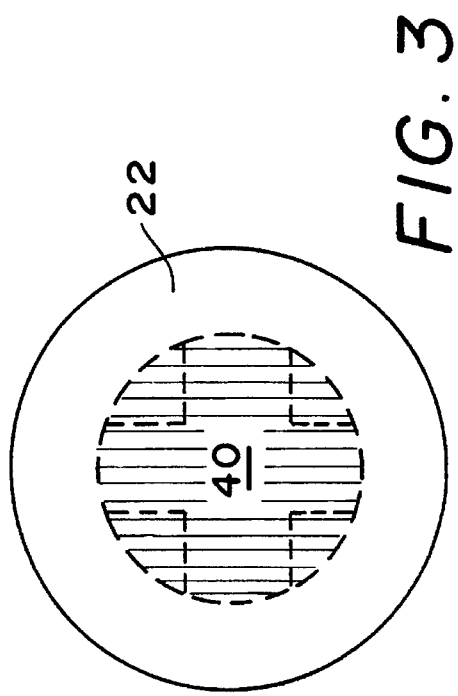
FIG. 3 is a top view of the adaptor of FIG. 2.
Figure 7:
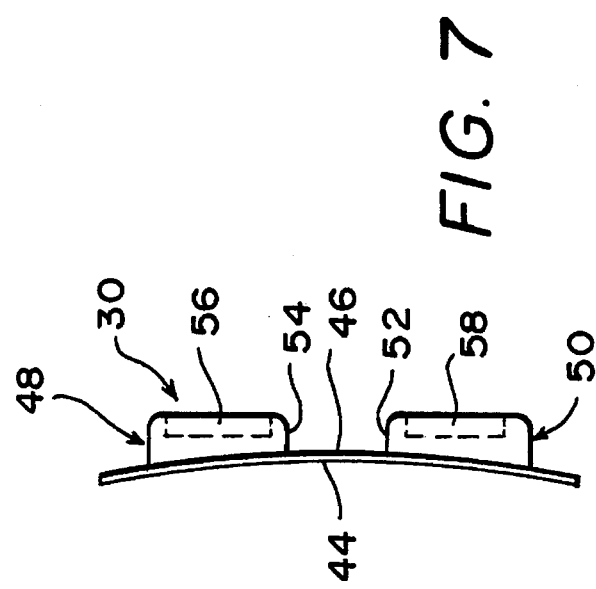
FIG. 7 is a side view of a two button adaptor bar.
Figure 5:
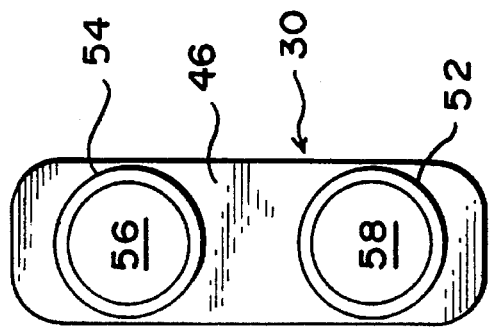
FIG. 5 is a bottom view of the adaptor bar for the two button controller.
Figure 6:
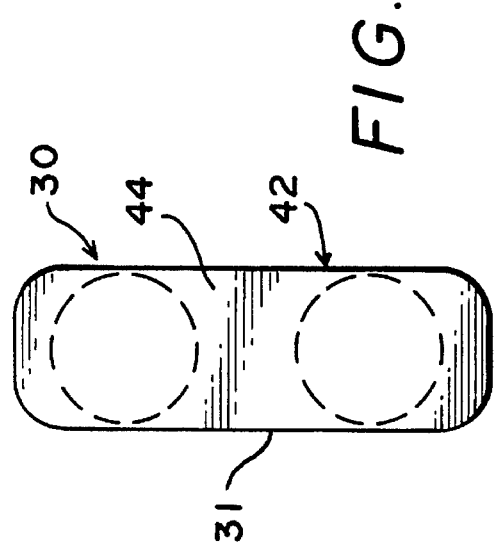
FIG. 6 is a top view of the adaptor bar.

FIG. 1 shows a typical portable electronic video game board machine 10 having a viewing screen 12, control pad 14, and control buttons 16, 18. The adaptor button 20 for the control pad 14 is shown to the left and the adaptor bar 30 for the buttons 16 and 18 is shown to the right.

It will be understood that the control pad 14 is a directional cross-shaped switch as used with various machinery and especially video game machinery having a raised vertical arm 15 and a raised horizontal arm 17 and the buttons 16 and 18 are the fire and special effects control buttons which are operated singularly or simultaneously as play requires. The depth, looking down the open spaces 19, of the cross-shaped arms is substantially less than the length of the vertical or horizontal arms. It will be appreciated that the cross-shaped arms have vertical sides 21 and 23 looking down the openings 19.

The adaptor, FIGS. 1, 2, 3 and 4, for the cross-shaped switch comprises a button 20 having a large top side 22 which is a continuous concave surface with a peripheral edge 23 and a vertical wall 24 extending downwardly from the underside 25 of the button 20. The wall 24 tapers inwardly to terminal circular base 26. The base 26 is substantially smaller is diameter than the top 22 and comprises triangular shaped members 28, each having flat bottom walls 30 and 32 and side walls 34 and 36 joined by semi-circular walls 38 of the base 26. It will be seen that the flat walls 30 and 32 and the walls 34 and 36 define a cross-shaped opening 40 which is received on the raised cross-shaped arms of control pad switch 14 for a video machine or other machinery having such controller pads.

In this regard, it will be seen that the triangular members 28 fit into the open recesses 19 of the raised cross-shaped switch and the walls 34 and 36 lie adjacent the walls 21 and 23 of the cross-shaped control pad switch whereby the adaptor button 20 is held firmly on the cross arms 15 and 17. It will be seen that the top surface 22 extends substantially beyond the outer edges 11 of the pad 14.

The large concave surface 22 of the adaptor button 20 provides a comfortable non-fatiguing ergometric control surface for the thumb of a player. The lever arm, due to the oversized top 22 mounted over the smaller base 26 attached to the controller 14, provides a mechanical advantage not available otherwise on the cross-shaped control pad switch per se.

The large continuous concave top surface 22 permits the thumb of the user to slide over it and about the outer periphery 23 quickly to facilitate precise control ability of the cross-shaped switch 14. In this regard, pressure on any point about the periphery 23 permits fast operation of the switch 14.

The adaptor, FIGS. 1, 5, 6 and 7 for the buttons 16 and 18 comprises a rectangular bar 42 having a top side 44 and bottom side 46. The top side 44 is concave which permits the thumb to slide over it easily and quickly. Depending from the bottom side 46 are two spaced apart bosses 48 and 50 having outer circular walls 52 and 54 which join the bottoms side 46. The bosses 48 and 50 have apertures 56 and 58 which are received on the controller buttons 16 and 18 whereby the adaptor bar 30 is held firmly thereto.

It will be appreciated that the large top concave surface 44 of the bar 30 provides a smooth continuous surface for the thumb of a player whereby the buttons 16 and 18 may be pushed singularly or simultaneously as play requires. The outer periphery 31 extends substantially beyond the outer edge 33 of buttons 16 and 18.

It is contemplated that double sided adhesive tape 60 and 62 having the same dimensions as the cross-shaped slots in the adaptor 20 and the apertures in the adaptor 30 will be employed to assist in one method of securing the adaptors 20 and 30 to the controller 14, 16 and 18. It will be appreciated that other fastening means may be employed to secure the adaptors 20 and 30 to their respective switches.

Figure 10:
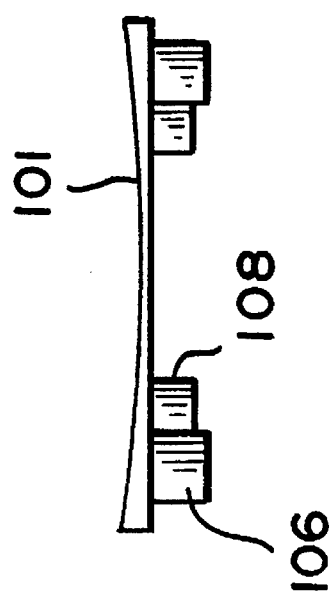
FIG. 10 is a side view of the four button adaptor.
Figure 8:
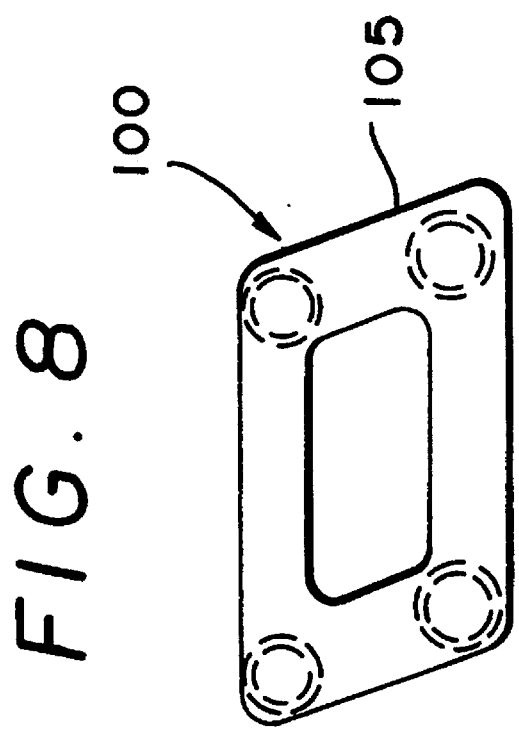
FIG. 8 is a top perspective view of a four button adaptor.
Figure 9:
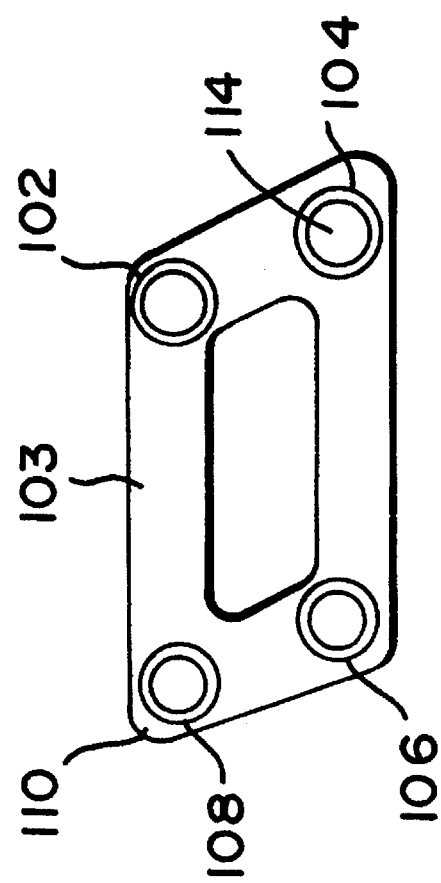
FIG. 9 is a bottom view of the four button adaptor.

FIGS. 8–10 show another embodiment of the invention comprising an adaptor 100 for a four button control. The adaptor 100 has a large concave top surface 101 over which a player may slide his thumb. The outer periphery 105 extends substantially beyond the four button control. The lower side 103 has four bosses 102, 104, 106, and 108 on the four corners 110. Each boss has an opening 114 which receives each of the raised four button switches of the video game machine.

Figure 11:
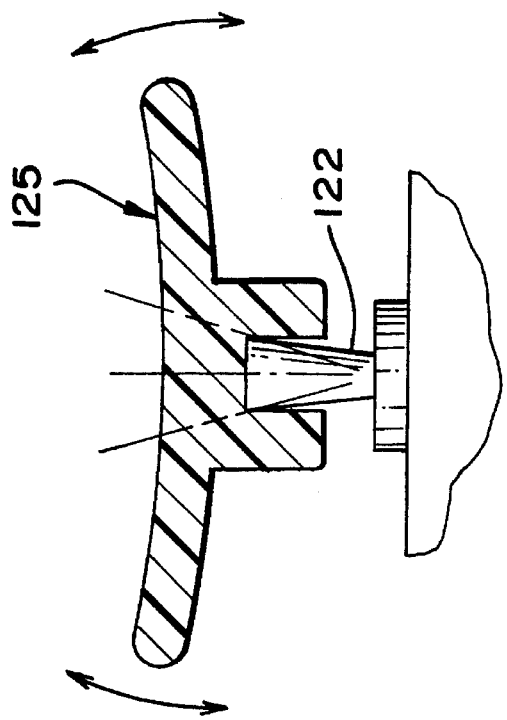
FIG. 11 is an enlarged, fragmentary view in side elevation of a shortened joy stick controller.
Figure 12:
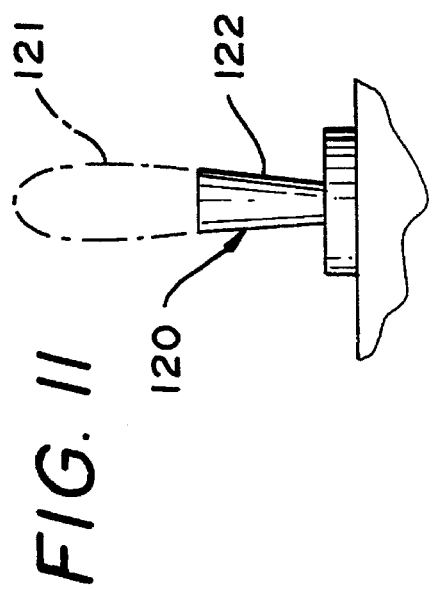
FIG. 12 is an enlarged, fragmentary view in side elevation of the shortened joy stick controller of FIG. 11, showing an adaptor according to the invention in transverse cross-section.
Figure 13:
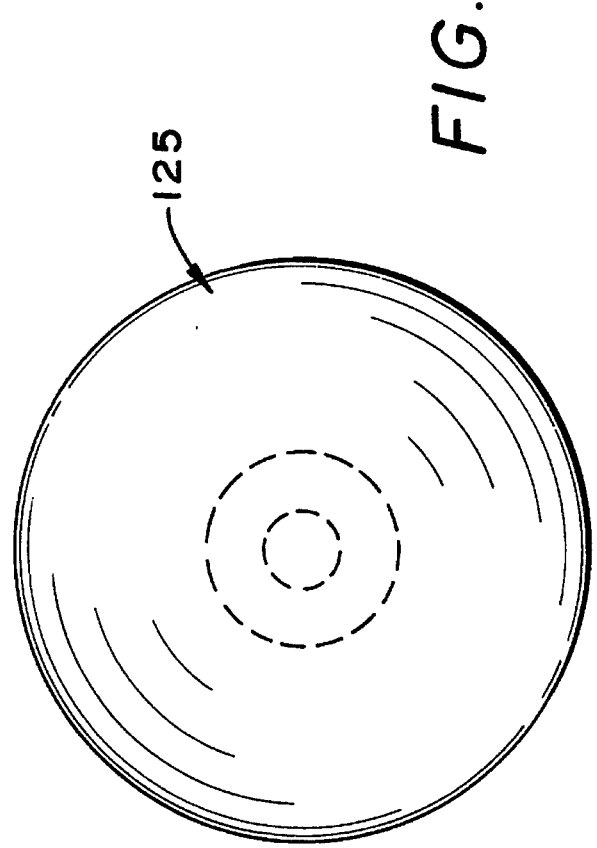
FIG. 13 is a top plan view of the adaptor of FIG. 12.

As seen in FIGS. 11–13, the present adaptor may be used in place of conventional joystick type controllers 120 whereby enhanced operation of a machine may be obtained. In this embodiment of the invention, the top portion 121 of a conventional joystick is removed as by cutting or the like and leaving a stub 122 of about ¼ to ½ inch to which the present adaptor 125 is attached. The replacement of the joystick with the present adaptor provides for quick and easy operation of a machine that eliminates over-control and fatigue as happens with conventional joysticks.

The present adaptor may be used in place of conventional joystick controllers in addition to controllers equipped with control pad and buttons whereby enhanced operation of a machine may be obtained. Further, it will be appreciated by those skilled in the art to which the invention pertains that the adaptor can be made as a unit to replace the control pad or joystick and control buttons during manufacture of various existing or future controllers.

While the invention has been described with regard to a preferred embodiment thereof, it will be appreciated by those skilled in the art to which the invention pertains that various modifications can be made in the design and operation and use of the invention without departing from the spirit and scope thereof.

What I claim is:

1. An adaptor for use on a machine having button-actuated switches for controlling the operation of the machine, wherein:

the adaptor comprises a base having means for attachment to multiple buttons in spanning relationship thereto, and a large top surface defining an actuating area that extends over at least the distance spanned by said multiple buttons, whereby an operator of said machine may actuate multiple buttons by placing his finger or fingers on the single large actuating area defined by said top surface of said adaptor and pressing downwardly on a desired portion of the adaptor to actuate one or more of said buttons and the associated switches, said single large actuating area facilitating the speed of operation of said buttons and defining a lever that provides a mechanical advantage in the operation of the buttons, thereby providing a more ergonomic design than conventional apparatus which requires individual and separate manipulation of each button;

said adaptor being generally circular in shape in plan view and concave in elevational view, and said base including four recess means, each recess means receiving a quadrant of a control pad for a set of spaced switches.

2. An adaptor as claimed in claim 1, wherein:

said movable control means comprises a plurality of buttons; and said adaptor is bar-shaped and extends in spanning relationship to at least two buttons, said base being elongate and having a recess near each end for receiving a respective one of said two buttons, and said actuating area is concave.

3. An adaptor as claimed in claim 1, wherein:

said adaptor is generally circular in plan view, and has recess means in its base adaptor to receive a cross-shaped control button.

4. An adaptor for use on a machine having button-actuated switches for controlling the operation of the machine, wherein:

the adaptor comprises a base having means for attachment to multiple buttons in spanning relationship thereto, and a large top surface defining an actuating area that extends over at least the distance spanned by said multiple buttons, whereby an operator of said machine may actuate multiple buttons by placing his finger or fingers on the single large actuating area defined by said top surface of said adaptor and pressing downwardly on a desired portion of the adaptor to actuate one or more of said buttons and the associated switches, said single large actuating area facilitating the speed of operation of said buttons and defining a lever that provides a mechanical advantage in the operation of the buttons, thereby providing a more ergonomic design than conventional apparatus which requires individual and separate manipulation of each button; and said adaptor is generally rectangular-shaped in plan view, and said base includes four spaced corners each with recess means therein for receiving a respective one of four spaced buttons, and said actuating area is concave.

* * * * *